(12) United States Patent
Fujishiro

(10) Patent No.: US 8,792,175 B2
(45) Date of Patent: Jul. 29, 2014

(54) VIRTUAL IMAGE DISPLAY SYSTEM

(75) Inventor: Takeshi Fujishiro, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/344,868

(22) Filed: Jan. 6, 2012

(65) Prior Publication Data
US 2012/0200787 A1 Aug. 9, 2012

(30) Foreign Application Priority Data
Feb. 4, 2011 (JP) .................................. 2011-022228

(51) Int. Cl.
G02B 27/14 (2006.01)
G03H 1/00 (2006.01)
G02B 27/01 (2006.01)
G02B 27/10 (2006.01)

(52) U.S. Cl.
CPC .... *G02B 27/0172* (2013.01); *G02B 2027/0178* (2013.01); *G02B 27/0101* (2013.01); *G02B 27/144* (2013.01); *G02B 27/106* (2013.01); *G02B 27/0103* (2013.01); *G02B 2027/0109* (2013.01)
USPC .............................. 359/630; 359/13; 359/629

(58) Field of Classification Search
USPC ...................................... 359/13, 14, 629–633
See application file for complete search history.

(56) References Cited

U.S. PATENT DOCUMENTS

| 2007/0070859 A1 | 3/2007 | Hirayama | |
|---|---|---|---|
| 2009/0168131 A1* | 7/2009 | Yamaguchi et al. | 359/13 |
| 2010/0157433 A1* | 6/2010 | Mukawa et al. | 359/633 |
| 2011/0221656 A1* | 9/2011 | Haddick et al. | 345/8 |

FOREIGN PATENT DOCUMENTS

| JP | A-10-293265 | 11/1998 |
|---|---|---|
| JP | A-2006-162767 | 6/2006 |

* cited by examiner

*Primary Examiner* — Mahidere Sahle
(74) *Attorney, Agent, or Firm* — Oliff PLC

(57) ABSTRACT

A virtual image display system includes a display device that outputs image light, a projection lens that projects the image light from the display device, a first holding member that holds the projection lens, a light guide plate that takes in the image light from the projection lens, and then, guides the light to an external predetermined position, and a second holding member that holds the light guide plate. A positioning structure for positioning the light guide plate with respect to the projection lens is provided in the first holding member and the second holding member.

6 Claims, 8 Drawing Sheets

VIRTUAL IMAGE DISPLAY SYSTEM

BACKGROUND

1. Technical Field

The present invention relates to a virtual image display system such as a head-mounted display mounted on a head of an observer.

2. Related Art

In related art, a virtual image display system (image display system) having an appearance of eyeglasses for an observer to observe an image formed by a display device such as an LCD (Liquid Crystal Display) as a virtual image using an optical system has been proposed (for example, see Patent Document 1 (JP-A-2006-162767)).

The virtual image display system disclosed in Patent Document 1 has a structure in which an image display unit having a display device (LCD or the like), a projection lens (objective lens), etc. and a light guide plate (substrate) are fixed to an eyeglass frame.

On the light guide plate, an entrance mirror and a combiner are respectively provided at one end side and the other end side.

The entrance mirror reflects image light output from the display device and projected by the projection lens as parallel light so that the image light may be totally reflected within the light guide plate and guided to the combiner.

Then, the combiner reflects the image light guided by the total reflection within the light guide plate and guides it to a predetermined position (the left eye or the right eye of the observer) outside of the light guide plate.

In the above described virtual image display system, in order to guide the image light to the left eye or the right eye of the observer in good condition (for the observer to observe the image in good condition), the positional relationship between the projection lens (optical axis) and the light guide plate (entrance mirror) is very important.

However, in the virtual image display system disclosed in Patent Document 1, a positioning structure for positioning the light guide plate with respect to the projection lens is not provided.

Therefore, in assembly of the virtual image display system, it is necessary to move the image display unit and the light guide plate to positions where the image may be observed in good condition while actually observing the image light, and then, fix the image display unit and the light guide plate to the eyeglass frame.

That is, there is a problem that positioning of the light guide plate with respect to the projection lens becomes complicated.

Further, in the virtual image display system disclosed in Patent Document 1, there is a problem that, for example, when the above described positioning structure is provided between an outer casing of the image display unit and the eyeglass frame, it is difficult to accurately position the light guide plate with respect to the projection lens.

Specifically, a holding member such as a lens tube for holding the projection lens, the outer casing of the image display unit, and the eyeglass frame intervene between the projection lens and the light guide plate to be positioned. That is, there are many members intervening between the projection lens and the light guide plate to be positioned, and manufacturing tolerances of the intervening members or the like are accumulated and the light guide plate tends to be displaced from the desired position with respect to the projection lens in assembly of the virtual image display system.

SUMMARY

An advantage of some aspects of the invention is to provide a virtual image display system in which positioning of a light guide plate with respect to a projection lens may be performed accurately and easily.

A virtual image display system according to an aspect of the invention includes a display device that outputs image light, a projection lens that projects the image light from the display device, a first holding member that holds the projection lens, a light guide plate that takes in the image light from the projection lens, and then, guides the light to an external predetermined position, and second holding member that holds the light guide plate, wherein a positioning structure for positioning of the light guide plate with respect to the projection lens is provided in the first holding member and the second holding member.

In the aspect of the invention, the positioning structure for positioning of the light guide plate with respect to the projection lens is provided in the virtual image display system.

According to the configuration, the virtual image display system is assembled using the positioning structure, and thereby, the projection lens and the light guide plate may be positioned in the positional relationship in which the observer may observe images in good condition.

Therefore, positioning of the light guide plate with respect to the projection lens may be easily performed.

Further, the positioning structure is provided in the first holding member that holds the projection lens and the second holding member that holds the light guide plate. That is, the members intervening between the projection lens and the light guide plate to be positioned may be two members of the first holding member and the second holding member.

However, it is difficult to provide a positioning structure for positioning of the light guide plate with respect to the projection lens in the projection lens and the light guide plate due to problems of materials of the projection lens and the light guide plate or the like.

Therefore, the members used for positioning of the light guide plate with respect to the projection lens are the minimum number (two) of members (the first holding member and the second holding member), and the positioning structure may be simplified. Further, the number of the members intervening between the projection lens and the light guide plate to be positioned may be the minimum number, and thus, the positioning of the light guide plate with respect to the projection lens may be performed with high accuracy.

In the virtual image display system according to the aspect of the invention, it is preferable that the light guide plate includes an image lead-in part that is provided to face the projection lens and leads the image light from the projection lens into the light guide plate, a total reflection part that has a pair of total reflection surfaces formed in flat shapes orthogonal to an optical axis of the projection lens in parallel to each other, and guides the image light that has been led into the light guide plate in a direction away from the image lead-in part by total reflection on the pair of total reflection surfaces, and an image lead-out part that leads the image light that has been guided by the total reflection surface to the external predetermined position.

In this configuration, since the light guide plate includes the above described image lead-in part, total reflection part, and image lead-out part, the observer may observe not only the images formed on the display device but also external images, and a see-through virtual image display system may be formed.

In the virtual image display system according to the aspect of the invention, it is preferable that the display devices, the projection lenses, the first holding members, and the light guide plates are respectively provided in pairs, and the second holding member integrates the respective light guide plates.

In this configuration, the display devices, the projection lenses, the first holding members, and the light guide plates are respectively provided in pairs corresponding to both eyes of the observer. Further, the second holding member integrates the pair of light guide plates corresponding to the eyes of the observer.

According to the configuration, compared to the configuration in which a pair of the second holding members are provided in correspondence with the pair of light guide plates, the positioning structure is provided in the pair of first holding members and the single second holding member and the structure may be simplified, and respective positioning of the pair of light guide plates with respect to the pair of projection lenses may be easily performed.

In the virtual image display system according to the aspect of the invention, it is preferable that the positioning structure includes an engaging part that projects from one of the first holding member and the second holding member along an optical axis of the projection lens toward the other, and an engagement receiving part that is provided in the other and engages with the engaging part, and the engaging part and the engagement receiving part engage with each other and position the light guide plate with respect to the projection lens within a plane orthogonal to the optical axis.

In this configuration, since the positioning structure includes the above described engaging part and engagement receiving part, the light guide plate may be positioned easily in the desired position within the plane orthogonal to the optical axis with respect to the projection lens by engaging the engaging part and engagement receiving part with each other.

In the virtual image display system according to the aspect of the invention, it is preferable that the engaging part includes a first engaging part and a second engaging part respectively provided on a first hypothetical line, the engagement receiving part includes a first engagement receiving part and a second engagement receiving part respectively provided on a second hypothetical line in parallel to the first hypothetical line and respectively fitting with the first engaging part and the second engaging part, and the second engagement receiving part is formed in an elongated hole extending along the second hypothetical line.

In this configuration, the first and second engaging parts are respectively provided on the first hypothetical line, and also the first and second engagement receiving parts are respectively provided on the second hypothetical line parallel to the first hypothetical line. Further, the second engagement receiving part is formed in the elongated hole extending along the second hypothetical line.

According to the configuration, even when the dimensions between the first and second engaging parts are dimensions with errors with respect to the designed dimensions, the light guide plate may be positioned easily in the desired position within the plane orthogonal to the optical axis with respect to the projection lens.

Further, since the second engagement receiving part is formed in the elongated hole, even when the dimensions between the first and second engaging parts change due to thermal contraction of the materials, the dimension changes between the first and second engaging parts due to thermal contraction may be absorbed by the second engagement receiving part.

In the virtual image display system according to the aspect of the invention, it is preferable that the first hypothetical line is orthogonal to a traveling direction of the image light within the light guide plate as seen from a direction along the optical axis of the projection lens, and the first engaging part and the second engaging part are respectively provided in positions opposed to each other with the light guide plate in between.

In this configuration, since the first and second engaging parts (first and second engagement receiving parts) are respectively provided in the above described positions, the light guide plate may be positioned in the desired position within the plane orthogonal to the optical axis of the projection lens in good condition in the position that does not interfere with the image light traveling within the light guide plate.

In the virtual image display system according to the aspect of the invention, it is preferable that the light guide plate includes an image lead-in part that is provided to face the projection lens and leads the image light from the projection lens into the light guide plate, a total reflection part that has a pair of total reflection surfaces formed in flat shapes orthogonal to the optical axis of the projection lens in parallel to each other, and guides the image light that has been led into the light guide plate in a direction away from the image lead-in part by total reflection on the pair of total reflection surfaces, and an image lead-out part that leads the image light that has been guided by the total reflection part to the external predetermined position, and the positioning structure includes a positioning surface provided in the first holding member in a flat shape orthogonal to the optical axis, and the positioning surface performs positioning of the light guide plate with respect to the projection lens in a direction along the optical axis by being in contact with the total reflection surface.

In this configuration, since the positioning structure includes the above described positioning surface, the light guide plate may be positioned easily in the desired position in the direction along the optical axis with respect to the projection lens by bringing the positioning surface into contact with the total reflection surface.

Further, since the total reflection surface of the light guide plate is formed to have flatness with high accuracy, by using the total reflection surface for positioning of the light guide plate with respect to the projection lens, the positioning structure may be simplified and the positioning of the light guide plate with respect to the projection lens may be performed with high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, one embodiment of the invention will be explained with reference to the drawings.

1. Configuration of Virtual Image Display System

Figure 1:
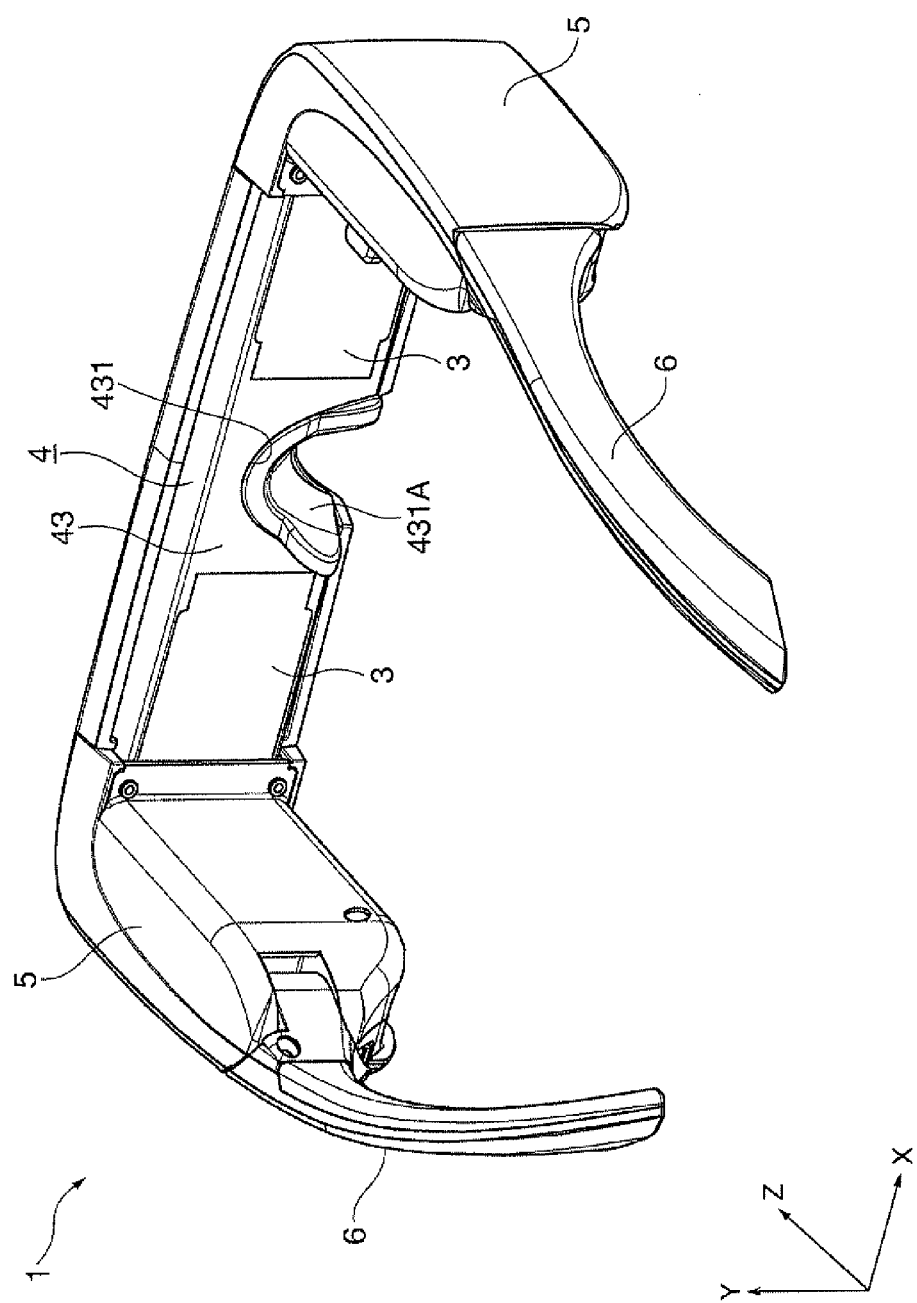
FIG. 1 is a perspective view showing an appearance of a virtual image display system in an embodiment.

FIG. 1 is a perspective view showing an appearance of a virtual image display system 1.

Figure 2:
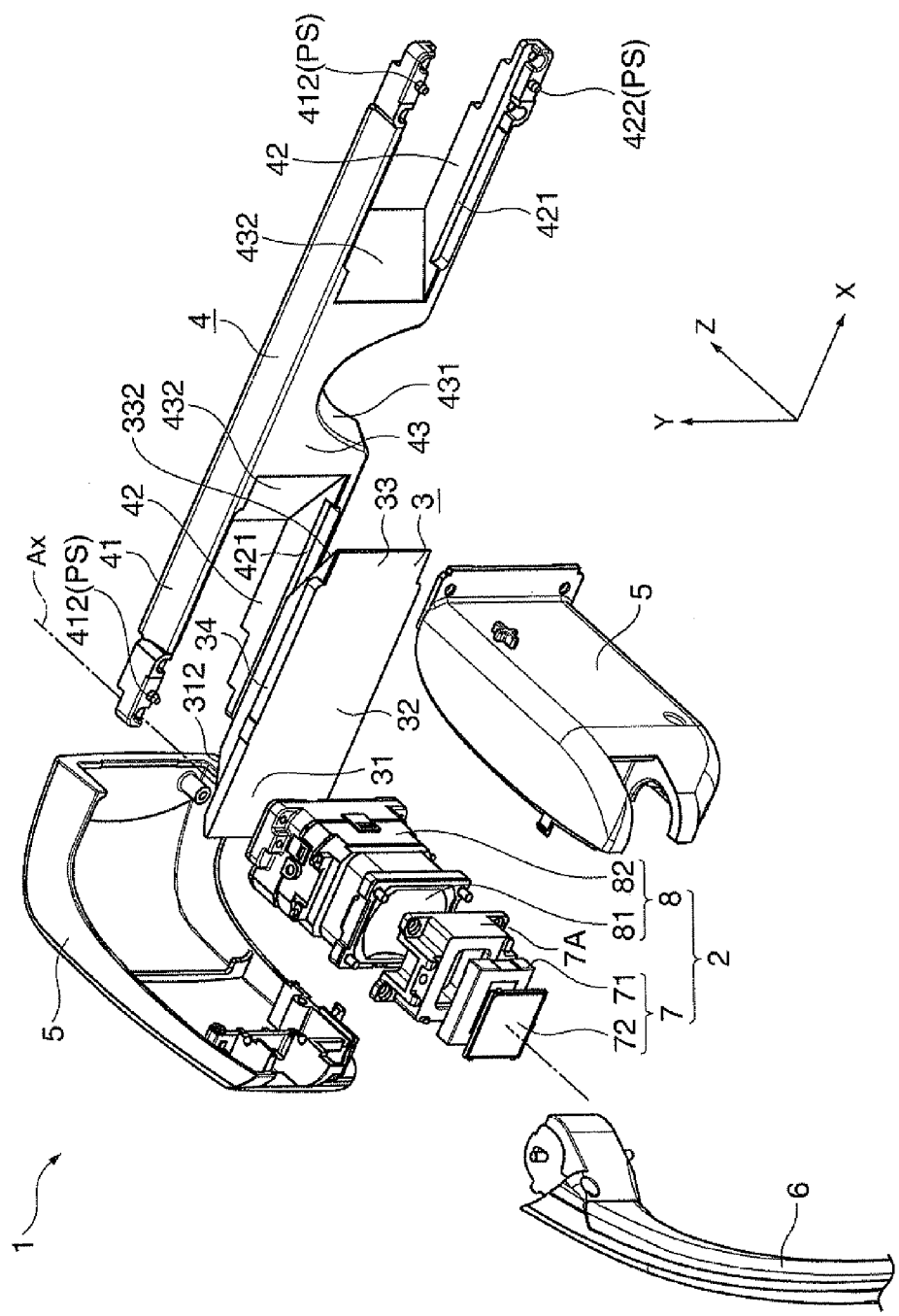
FIG. 2 is an exploded perspective view showing a configuration of the virtual image display system in the embodiment.

FIG. 2 is an exploded perspective view showing a configuration of the virtual image display system 1.

Note that, in FIGS. 1 and 2, for convenience of explanation, an axis in parallel to an optical axis Ax (FIG. 2) of a projection lens 81, which will be described later, is the Z-axis, and the horizontal axis orthogonal to the Z-axis is the X-axis, the vertical axis orthogonal to the Z-axis is the Y-axis. The same is applicable to the subsequent drawings. Further, regarding the Z-axis, the observer's side is the −Z-axis side and the side away from the observer is the +Z-axis side.

FIGS. 1 and 2 are the views as seen from the −Z-axis side. In addition, for convenience of explanation, FIG. 2 shows an exploded state of only the side corresponding to the left eye of the observer.

The virtual image display system 1 is a head-mounted display having an appearance like eyeglasses as shown in FIG. 1 or 2, and allows an observer wearing the virtual image display system 1 to recognize image light by a virtual image. Further, the virtual image display system 1 of the embodiment includes a see-through virtual image display system for see-through observation of an external image.

The virtual image display system 1 includes image forming units 2 (FIG. 2), light guide plates 3, a rim 4 as a second holding member, covers 5 covering the image forming unit 2 and fixed to the rim 4, and temples 6 attached to the covers 5 as shown in FIG. 1 or 2.

Note that, as shown in FIGS. 1 and 2, the image forming units 2, the light guide plates 3, the covers 5, and the temples 6 are provided in pairs respectively corresponding to the left eye and the right eye of the observer who wears the virtual image display system 1, and placed symmetrically with respect to the YZ plane.

The pair of image forming units 2, the pair of light guide plates 3, the pair of covers 5, and the pair of temples 6 have the same configuration between left and right, and only the side corresponding to the left eye of the observer will be explained.

2. Configuration of Image Forming Unit

The image forming unit 2 is a member that forms and projects image light, and includes a display device 7 and a projection optical device 8 as shown in FIG. 2.

As shown in FIG. 2, the display device 7 includes a transmissive liquid crystal display device 71 that modulates incident light and forms image light, and a backlight 72 that is attached to the light-incident side of the liquid crystal display device 71 and outputs light to the liquid crystal display device 71.

As shown in FIG. 2, the projection optical device 8 includes a projection lens 81 that projects image light output from the display device 7 as parallel light, and a lens tube 82 as a first holding member that holds the projection lens 81 inside.

Further, the display device 7 is fixed to an end surface at the −Z-axis side in the lens tube 82 via an attachment member 7A (FIG. 2).

3. Configuration of Light Guide Plate

Figure 3A:
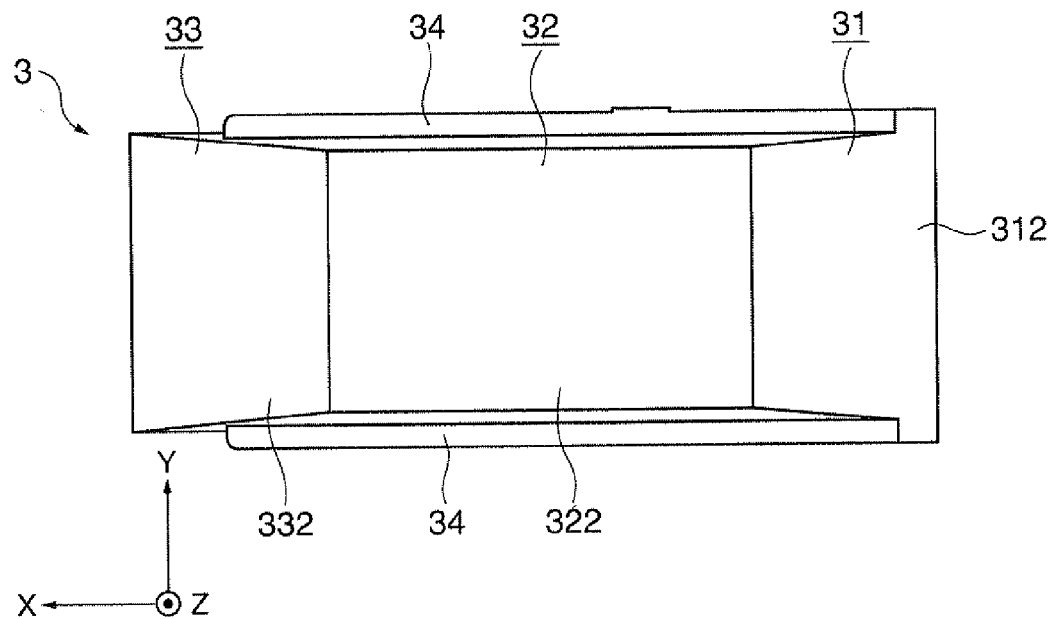
FIG. 3A shows a configuration of a light guide plate in the embodiment when the light guide plate is seen from the +Z-axis side.
Figure 3B:
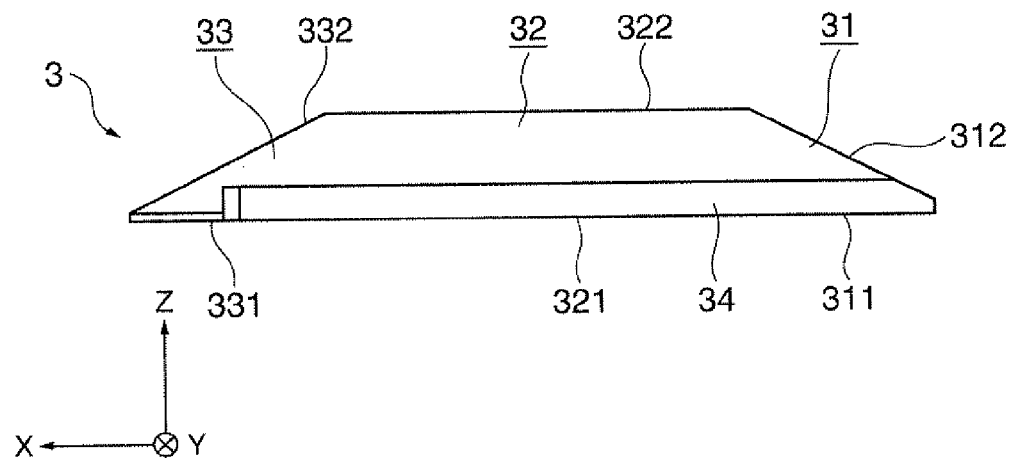
FIG. 3B shows the configuration of the light guide plate in the embodiment when the light guide plate is seen from below along the Y-axis.

FIGS. 3A and 3B show a configuration of the light guide plate 3. Specifically, FIG. 3A shows the light guide plate 3 as seen from the +Z-axis side, and FIG. 3B shows the light guide plate 3 as seen from below along the Y-axis.

The light guide plate 3 is formed by a resin material having light-transmissivity, and takes in the image light projected from the image forming unit 2, and then, guides it to an external predetermined position (the left eye or the right eye of the observer).

As shown in FIG. 2 or FIGS. 3A and 3B, the light guide plate 3 includes an image lead-in part 31, a total reflection part 32, an image lead-out part 33 integrally formed, and is formed nearly in an isosceles trapezoid as seen from the direction along the Y-axis.

As shown in FIG. 2 or FIGS. 3A and 3B, the image lead-in part 31 is formed nearly in a triangular shape extending along the Y-axis and located at the side away from the other light guide plate 3 in the assembled virtual image display system 1.

The image lead-in part 31 is provided to face the projection lens 81 in the assembled virtual image display system 1, and leads the image light projected from the projection lens 81 into the light guide plate 3.

As shown in FIGS. 3A and 3B, a light-incident surface 311 and a first reflection surface 312 are formed on the outer surface of the image lead-in part 31.

The light-incident surface 311 is a surface formed in a flat shape in parallel to the XY plane and opposed to the projection lens 81. The image light projected from the projection lens 81 enters the surface.

The first reflection surface 312 is opposed to the light-incident surface 311 and formed by deposition such as aluminum evaporation on the flat slope inclined with respect to the XY plane, and reflects the image light that has been led by the image lead-in part 31 via the light-incident surface 311 toward the total reflection part 32.

As shown in FIG. 2 or FIGS. 3A and 3B, the total reflection part 32 has a rectangular plate shape extending along the XY plane and integrally formed with the image lead-in part 31.

Further, as shown in FIGS. 3A and 3B, the total reflection part 32 has a first total reflection surface 321 and a second total reflection surface 322, and guides the image light reflected on the first reflection surface 312 in the direction away from the image lead-in part 31 (toward the side closer to the other light guide plate 3) by total reflection on the first and second total reflection surfaces 321, 322.

The first total reflection surface 321 is formed by a flat surface as an extension of the light-incident surface 311 (in parallel to the XY plane (orthogonal to the optical axis Ax)), and located at the −Z-axis side.

The second total reflection surface 322 is formed in a flat shape in parallel to the first total reflection surface 321, and located at the +Z-axis side.

Note that the first and second total reflection surfaces 321, 322 not only include surfaces that totally reflect and guide the image light by interfaces between air and themselves without mirrors, half-mirrors, or the like formed thereon but also use reflection by mirror coatings, half-mirror films, or the like formed on the entire or parts of the first and second total reflection surfaces 321, 322. For example, the case where the incident angle of the image light satisfies the total reflection condition and mirror coatings or the like are formed on the entire or parts of the first and second total reflection surfaces 321, 322 and all of the image light is substantially reflected may be included. Further, as long as image light with sufficient brightness is obtained, the entire or parts of the first and second total reflection surfaces 321, 322 may be coated with mirrors with some transmissivity.

As shown in FIG. 2 or 3A and 3B, the image lead-out part 33 has a nearly triangular prism shape extending in the Y-axis like the image lead-in part 31, and is integrally formed with the total reflection part 32 and located at the side closer to the other light guide plate 3 in the assembled virtual image display system 1.

Further, the image lead-out part 33 guides the image light that has been guided by the total reflection part 32 to the external predetermined position (the left eye or the right eye of the observer) by reflection.

On the outer surface of the image lead-out part 33, as shown in FIGS. 3A and 3B, a light-exiting surface 331 and a second reflection surface 332 are formed.

The light-exiting surface 331 is formed by a surface as an extension of the first total reflection surface 321.

The second reflection surface 332 is opposed to the light-exiting surface 331 and formed in a flat shape inclined with respect to the XY plane, and guides the image light that has been guided by the total reflection part 32 to the external predetermined position (the left eye or the right eye of the observer) by reflection.

The second reflection surface 332 includes a half-mirror or the like, and is adapted to reflect the image light and transmit an external image.

Note that, as the image lead-out part 33, as long as it has a function of guiding the image light that has been guided by the total reflection part 32 to the external predetermined position, not limited to the second reflection surface 332 of the half-mirror or the like, but a polarization beam splitter, a hologram diffraction grating, or the like may be employed.

Further, on the upper and lower ends (both ends in the Y-axis direction) of the above described light guide plate 3, as shown in FIG. 2 or FIGS. 3A and 3B, projection parts 34 respectively projecting upward and downward and extending along the X-axis are respectively formed.

4. Configuration of Rim

Figure 4A:
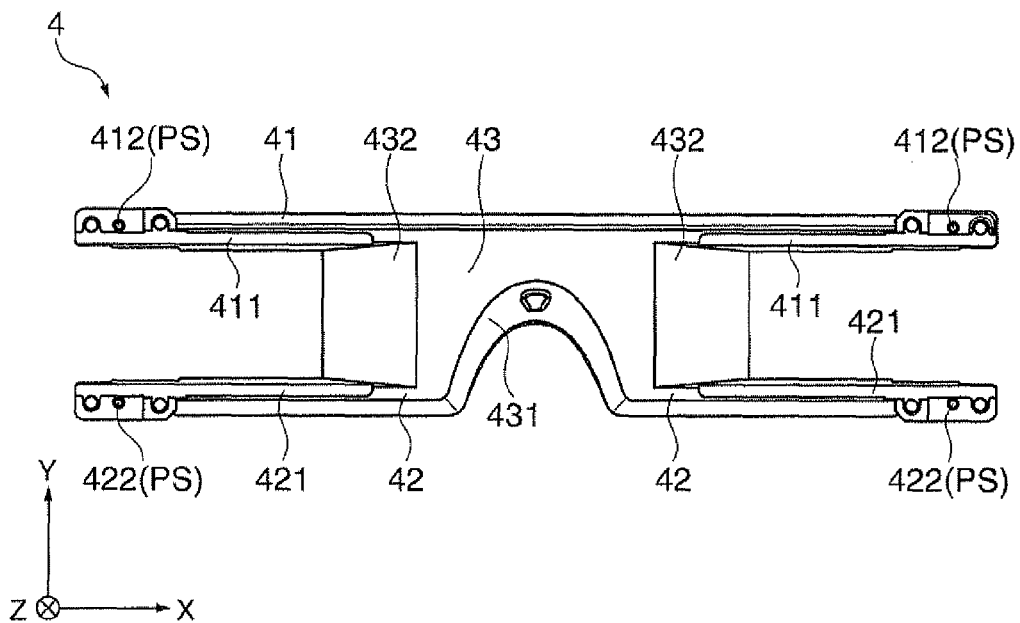
FIG. 4A shows a configuration of a rim in the embodiment when the rim is seen from the −Z-axis side.
Figure 4B:
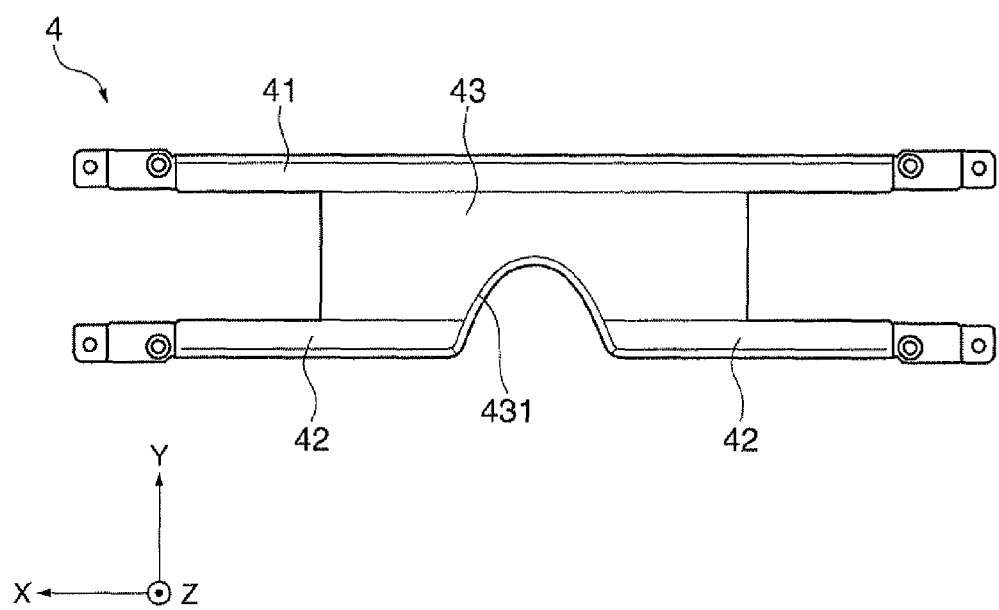
FIG. 4B shows the configuration of the rim in the embodiment when the rim is seen from the +Z-axis side.

FIGS. 4A and 4B show a configuration of the rim 4. Specifically, FIG. 4A shows the rim 4 as seen from the −Z-axis side and FIG. 4B shows the rim 4 as seen from the +Z-axis side.

The rim 4 is formed by a resin material having light-transmissivity or the like, has a horizontally symmetric shape, and holds (integrates) the pair of light guide plates 3 with the image lead-out parts 33 of the pair of light guide plates 3 close to each other.

As shown in FIG. 2 or FIGS. 4A and 4B, the rim 4 includes an upper frame part 41, a pair of lower frame parts 42, and an bridge part 43 integrally formed.

The upper frame part 41 is a member having a section nearly in a rectangular shape extending along the X-axis, and supports the upper sides of the pair of light guide plates 3.

As shown in FIG. 4A, upper concave parts 411 according to the outer shapes of the respective projection parts 34 provided at the upper sides of the pair of light guide plates 3 are formed on left and right sides opposed to the pair of lower frame parts 42 on the end surface at the −Z-axis side of the upper frame part 41.

The pair of lower frame parts 42 are members having sections nearly in rectangular shapes extending along the X-axis, provided at the lower side with respect to the upper frame part 41, arranged in parallel along the X-axis, and supports the lower sides of the pair of light guide plates 3.

As shown in FIG. 2 or FIG. 4A, lower concave parts 421 according to the outer shapes of the respective projection parts 34 provided at the lower sides of the pair of light guide plates 3 are respectively formed on the end surfaces at the −Z-axis side of the pair of lower frame parts 42.

The bridge part 43 is located at the center of the rim 4 and bridged between the upper frame part 41 and the pair of lower frame parts 42.

In the bridge part 43, as shown in FIG. 2 or FIGS. 4A and 4B, a cutout part 431 cut out nearly in an arc shape as seen from the direction along the Z-axis from between the pair of lower frame parts 42 to the upper sides is formed.

Further, a nose pad 431A (FIG. 1) in contact with the nose of the observer when the observer wears the virtual image display system 1 is detachably attached to the cutout part 431.

Furthermore, as shown in FIG. 2 or 4A, slopes 432 according to the respective second reflection surfaces 332 in the pair of light guide plates 3 are respectively formed on the left and right ends at the −Z-axis side in the bridge part 43.

In addition, the pair of light guide plates 3 are fixed to (integrated with) the rim 4 using an adhesive with the upper and lower projection parts 34 in contact with the respective concave parts 411, 421 and the respective second reflection surfaces 332 in contact with the respective slopes 432.

Note that, under the condition, the light guide plates 3 are fitted to fill the C-shaped parts surrounded by the upper frame part 41, the lower frame parts 42, and the bridge part 43.

Further, under the condition, in the bridge part 43, the end surface at the −Z-axis side is nearly flush with the respective first total reflection surfaces 321 of the pair of light guide plates 3, and the end surface at the +Z-axis side is nearly flush with the respective second total reflection surfaces 322 of the pair of light guide plates 3.

Furthermore, a positioning structure PS (see FIGS. 5 to 7) for positioning the light guide plates 3 with respect to the projection lens 81 (positioning the first reflection surface 312 in the predetermined position with respect to the optical axis Ax) is provided in the above described lens tube 82 and rim 4.

5. Configuration of Positioning Structure

Figure 5:
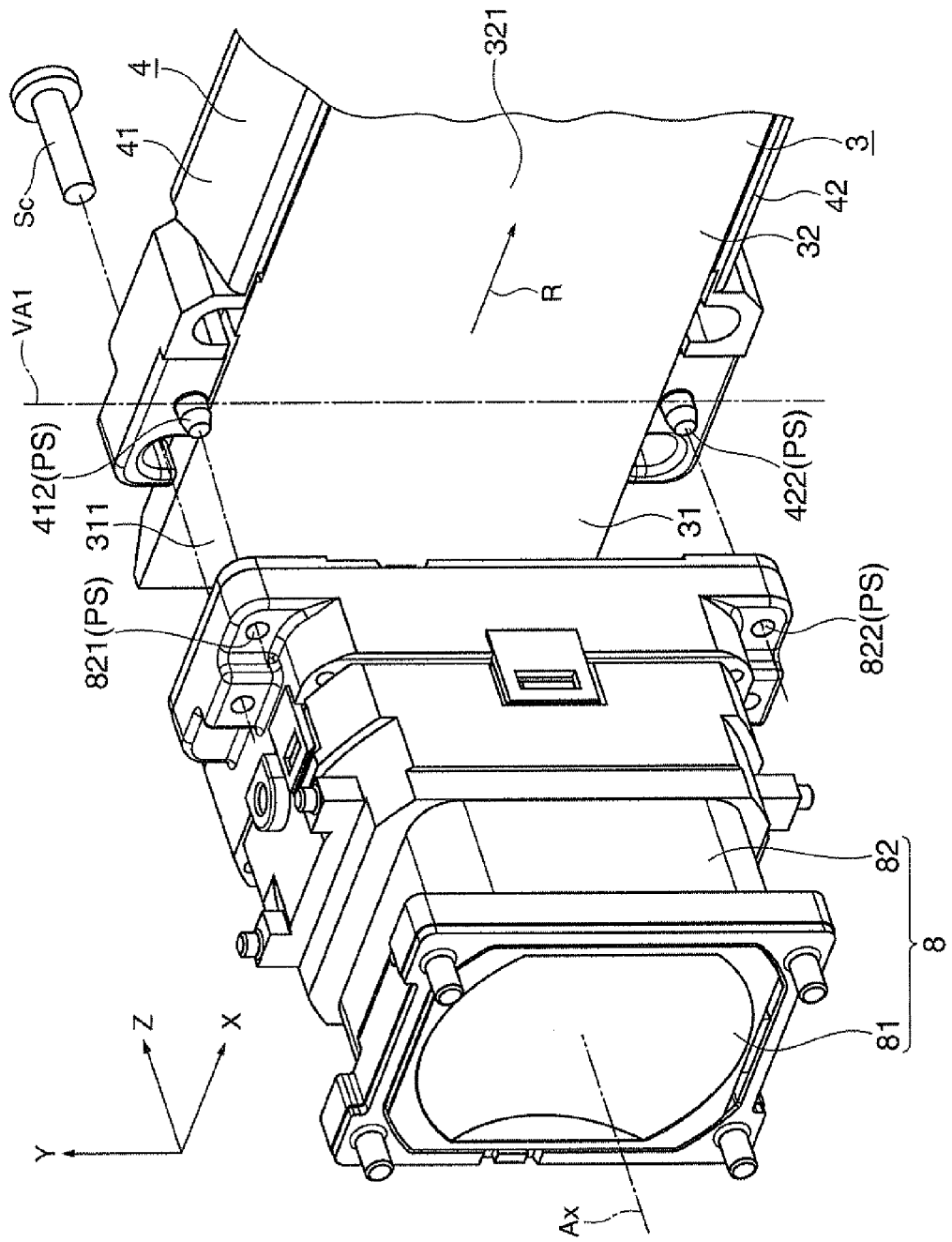
FIG. 5 shows a positioning structure of the light guide plate with respect to a projection optical device in the embodiment.
Figure 6:
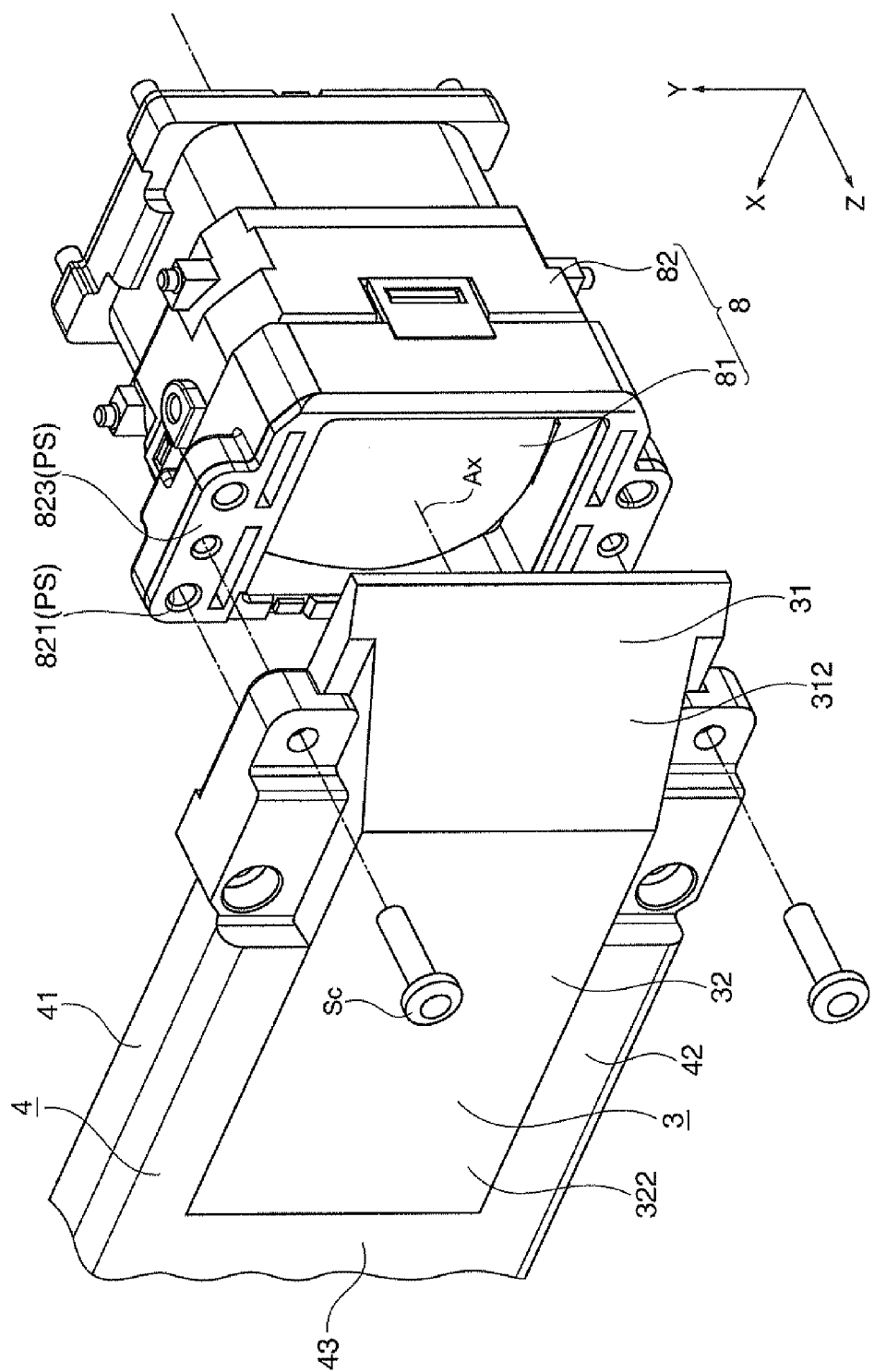
FIG. 6 shows the positioning structure of the light guide plate with respect to the projection optical device in the embodiment.
Figure 7:
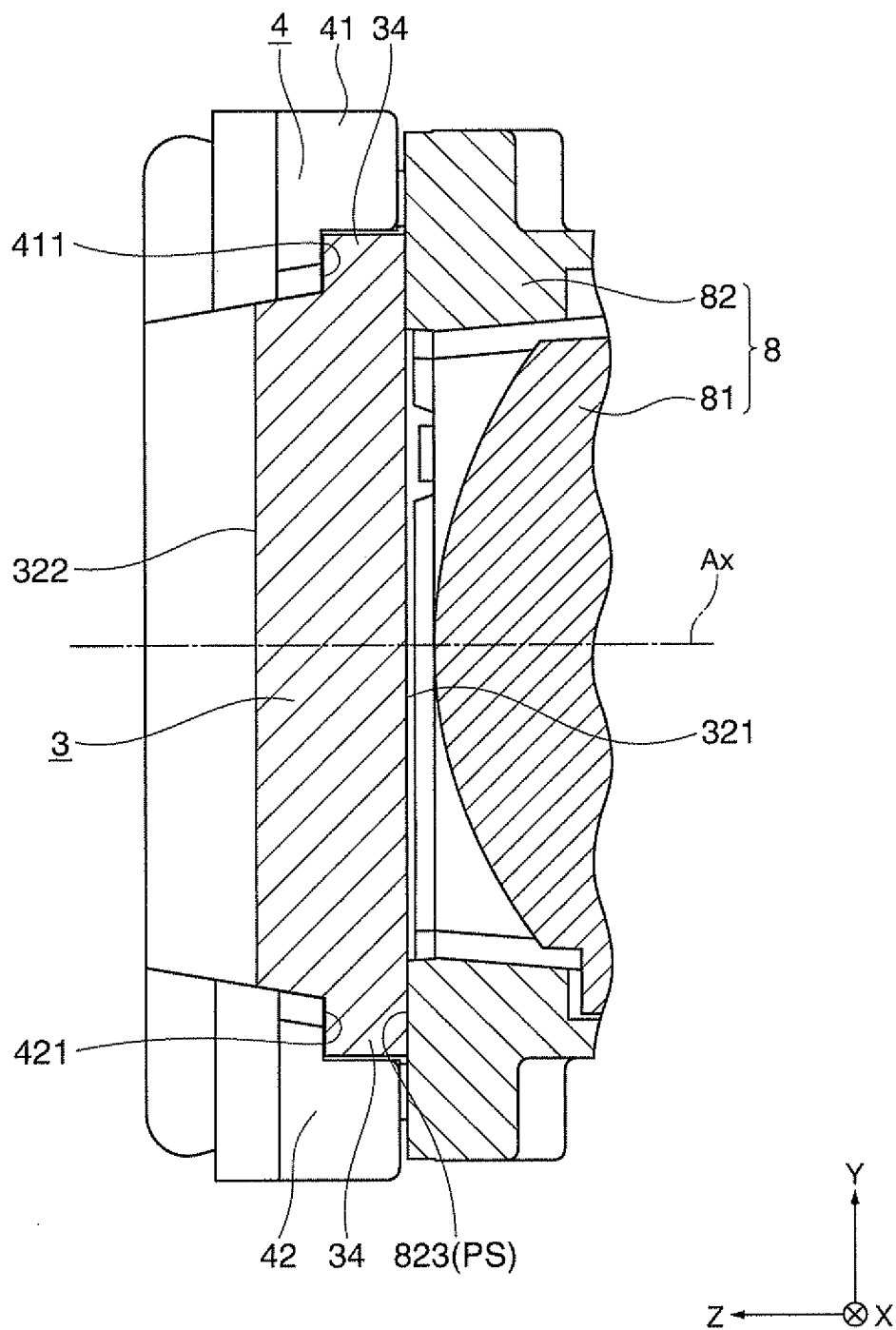
FIG. 7 shows the positioning structure of the light guide plate with respect to the projection optical device in the embodiment.
Figure 8:
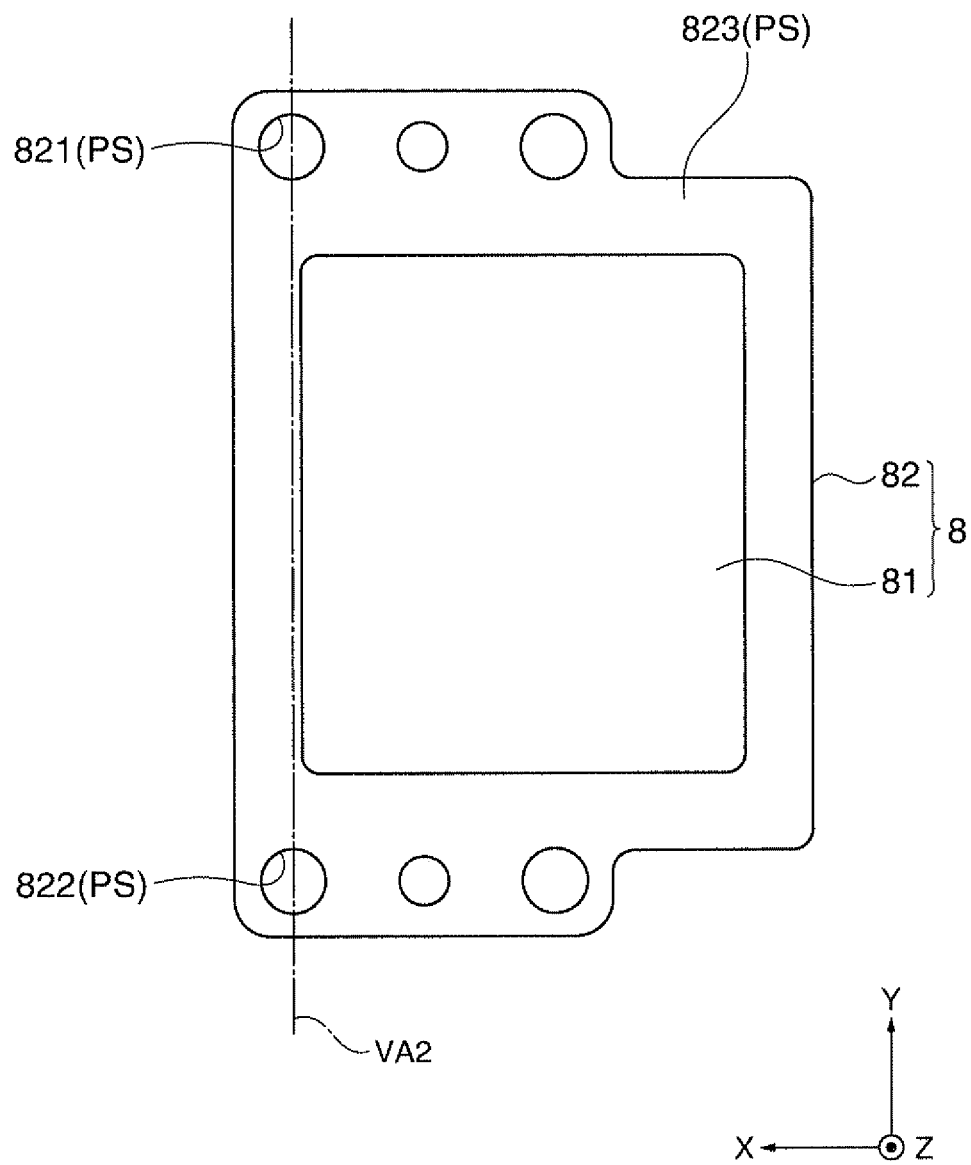
FIG. 8 shows the positioning structure of the light guide plate with respect to the projection optical device in the embodiment.

FIGS. 5 to 8 show the positioning structure PS of the light guide plate 3 with respect to the projection lens 81. Specifically, FIG. 5 is an exploded perspective view of the positioning structure PS as seen from the −Z-axis side. FIG. 6 is an exploded perspective view of the positioning structure PS as seen from the +Z-axis side. FIG. 7 is a sectional view showing a state in which the rim 4 and the projection optical device 8 are secured cut along the YZ plane. FIG. 8 is a schematic view of the lens tube 82 as seen from the +Z-axis side.

As shown in FIGS. 5 to 8, the positioning structure PS includes first and second engaging parts 412, 422 (FIG. 5), first and second engagement receiving parts 821, 822 (FIGS. 5, 6, 8), and a positioning surface 823 (FIGS. 6 to 8).

The first and second engaging parts 412, 422 are provided in the rim 4 as shown in FIG. 5.

Specifically, the first engaging part 412 is located at the upper side of the image lead-in part 31 in the upper frame part 41, and formed nearly in a cylinder shape protruding from the end surface at the −Z-axis side along the Z-axis.

The second engaging part 422 is located at the lower side of the image lead-in part 31 in the lower frame part 42, and formed nearly in a cylinder shape protruding from the end surface at the −Z-axis side along the Z-axis.

Further, these first and second engaging parts 412, 422 are respectively formed in positions opposed with the light guide plate 3 in between on a first hypothetical line VA1 in parallel to the Y-axis.

Note that, as shown in FIG. 5, the first hypothetical line VA1 is orthogonal to the traveling direction R of the image light by total reflection within the light guide plate 3 as seen from the direction along the Z-axis.

As shown in FIG. 6 or 8, the first and second engagement receiving parts 821, 822 are provided in the lens tube 82.

Specifically, the first engagement receiving part 821 is located at the upper side of the end surface at the +Z-axis side in the lens tube 82, and formed in a concave shape having nearly the same inner diameter as the outer diameter of the first engaging part 412.

The second engagement receiving part 822 is located at the lower side of the end surface at the +Z-axis side in the lens tube 82, has nearly the same width dimension as that of the outer diameter of the second engaging part 422, and is formed in an elongated hole extending along the Y-axis.

Further, these first and second engagement receiving parts 821, 822 are formed on a second hypothetical line VA2 (FIG. 8) in parallel to the Y-axis (the first hypothetical line VA1).

The positioning surface 823 is provided in the lens tube 82 as shown in FIGS. 6 to 8.

Specifically, the positioning surface 823 is the end surface at the +Z-axis side surrounding the periphery of the projection lens 81 as seen from the direction along the optical axis Ax in the lens tube 82, and formed in a flat shape in parallel to the XY plane.

Further, the first and second engaging parts 412, 422 are inserted into the first and second engagement receiving parts 821, 822 and engage with each other, and thereby, the light guide plate 3 is positioned in the desired position within the XY plane (for example, the position where the optical axis Ax coincides with the center of the first reflection surface 312) with respect to the projection lens 81.

Furthermore, the positioning surface 823 is in contact with the first total reflection surface 321 (FIG. 7), and thereby, the light guide plate 3 is positioned in the desired position along the +Z-axis with respect to the projection lens 81.

As described above, the light guide plate 3 is positioned with respect to the projection lens 81 using the positioning structure PS, then, the rim 4 and the lens tube 82 are secured using screws Sc (FIGS. 5, 6), and thereby, the rim 4 and the projection optical device 8 are secured.

According to the above described embodiment, there are the following advantages.

In the embodiment, the positioning structure PS is provided in the virtual image display system 1.

Thus, the virtual image display system 1 is assembled using the positioning structure PS, and thereby, the projection lens 81 and the light guide plate 3 may be positioned in the positional relationship in which the observer may observe images in good condition.

Therefore, positioning of the light guide plate 3 with respect to the projection lens 81 may be performed easily.

Further, the positioning structure PS is provided in the lens tube 82 and the rim 4. That is, the members intervening between the projection lens 81 and the light guide plate 3 to be positioned are the two members of the lens tube 82 and the rim 4.

Therefore, the members used for positioning of the light guide plate 3 with respect to the projection lens 81 may be the minimum number (two) of members, and the positioning structure PS may be simplified. Further, the number of members intervening between the projection lens 81 and the light guide plate 3 to be positioned may be the minimum number, and the positioning of the light guide plate 3 with respect to the projection lens 81 may be performed with high accuracy.

Furthermore, since the light guide plate 3 has the image lead-in part 31, the total reflection part 32, and the image lead-out part 33, the observer may observe not only the images formed on the display device 7 but also external images, and a see-through virtual image display system 1 may be formed.

In addition, the image forming units 2 and the light guide plates 3 are respectively provided in pairs corresponding to both eyes of the observer. The rim 4 integrates the pair of light guide plates 3 corresponding to the eyes of the observer.

According to the configuration, compared to the configuration in which a pair of rims 4 are provided in correspondence with the pair of light guide plates 3, the positioning structure PS is provided in the pair of lens tubes 82 and the single rim 4 and the structure may be simplified, and respective positioning of the pair of light guide plates 3 with respect to the pair of, projection lenses 8 may be easily performed.

Further, since the positioning structure PS includes the first and second engaging parts 412, 422 and the first and second engagement receiving parts 821, 822, the light guide plate 3 may be positioned easily in the desired position within the XY plane orthogonal to the optical axis Ax with respect to the projection lens 81 only by engaging the first and second engaging parts 412, 422 and the first and second engagement receiving parts 821, 822 with each other.

Furthermore, the first and second engaging parts 412, 422 are located on the hypothetical line in parallel to the Y-axis and the first and second engagement receiving parts 821, 822 are also located on the hypothetical line in parallel to the Y-axis. The second engagement receiving part 822 is formed in the elongated hole extending in the Y-axis direction.

According to the configuration, even when the dimensions between the first and second engaging parts 412, 422 are dimensions with errors with respect to the designed dimensions, the light guide plate 3 may be positioned in the desired position within the XY plane with respect to the projection lens 81.

Further, since the second engagement receiving part 822 is formed in the elongated hole, even when the dimensions between the first and second engaging parts 412, 422 change due to thermal contraction of the materials in the rim 4, the dimension changes between the first and second engaging parts 412, 422 due to thermal contraction may be absorbed by the second engagement receiving part 822.

Furthermore, the first and second engaging parts 412, 422 (first and second engagement receiving parts 821, 822) are respectively provided in the positions opposed with the light guide plate 3 in between on the first hypothetical line VA1 (second hypothetical line VA2) orthogonal to the traveling direction R of the image light within the light guide plate 3 as seen from the direction along the Z-axis.

According to the configuration, the light guide plate 3 may be positioned in the desired position within the XY plane with respect to the projection lens 81 in good condition in the position that does not interfere with the image light travelling within the light guide plate 3.

Further, since the positioning structure PS includes the positioning surface 823, the light guide plate 3 may be positioned easily in the desired position in the direction along the optical axis Ax with respect to the projection lens 81 only by bringing the positioning surface 823 into contact with the first total reflection surface 321.

Furthermore, since the first total reflection surface 321 is formed to have flatness with high accuracy, by using the first total reflection surface 321 for positioning of the light guide plate 3 with respect to the projection lens 81, the positioning structure PS may be simplified and the positioning of the light guide plate 3 with respect to the projection lens 81 may be performed with high accuracy.

Note that the invention is not limited to the above described embodiment, but the invention includes modifications, improvements, etc. within the range in which the purpose of the invention may be achieved.

In the embodiment, in the virtual image display system 1, the image forming units 2 and the light guide plates 3 have been respectively provided in pairs corresponding to both eyes of the observer, however, not limited to those, of the pair of image forming units 2, one image forming unit 2 may be omitted for image observation by a single eye.

In the embodiment, the virtual image display system 1 has employed the transmissive liquid crystal display device 71, however, not limited to that, other configurations, for example, a reflective liquid crystal display device, a digital micromirror device, etc. may be employed.

In the embodiment, the virtual image display system 1 has included the head-mounted display, however, not limited to that, the virtual image display system may include a head-up display.

In the embodiment, the first and second engaging parts 412, 422 have been provided in the rim 4 and the first and second engagement receiving parts 821, 822 have been provided in the lens tube 82, however, conversely, the first and second engaging parts may be provided in the lens tube and the first and second engagement receiving parts may be provided in the rim.

The invention may be used for a virtual image display system of a head-mounted display or the like.

The entire disclosure of Japanese Patent Application No. 2011-022228, filed Feb. 4, 2011 is expressly incorporated by reference herein.

What is claimed is:

1. A virtual image display system comprising:
a display device that outputs image light;
a projection lens that projects the image light from the display device;
a first holding member that holds the projection lens;
a light guide plate that takes in the image light from the projection lens, and then, guides the light to an external predetermined position; and
a second holding member that holds the light guide plate,
wherein a positioning structure for positioning of the light guide plate with respect to the projection lens is provided within the first holding member and within the second holding member,
wherein the light guide plate includes:
an image lead-in part that is provided to face the projection lens and leads the image light from the projection lens into the light guide plate;
a total reflection part that has a pair of total reflection surfaces formed in flat shapes orthogonal to an optical axis of the projection lens in parallel to each other, and guides the image light that has been led into the light guide plate in a direction away from the image lead-in part by total reflection on the pair of total reflection surfaces; and
an image lead-out part that leads the image light that has been guided by the total reflection surface to the external predetermined position.

2. The virtual image display system according to claim 1, wherein the display devices, the projection lenses, the first holding members, and the light guide plates are respectively provided in pairs, and
the second holding member integrates the respective light guide plates.

3. The virtual image display system according to claim 1, wherein the positioning structure includes:
an engaging part that projects from one of the first holding member and the second holding member along an optical axis of the projection lens toward the other; and
an engagement receiving part that is provided in the other and engages with the engaging part, and
the engaging part and the engagement receiving part engage with each other and position the light guide plate with respect to the projection lens within a plane orthogonal to the optical axis.

4. The virtual image display system according to claim 3, wherein the engaging part includes a first engaging part and a second engaging part respectively provided on a first hypothetical line,
the engagement receiving part includes a first engagement receiving part and a second engagement receiving part respectively provided on a second hypothetical line in parallel to the first hypothetical line and respectively fitting with the first engaging part and the second engaging part, and
the second engagement receiving part is formed in an elongated hole extending along the second hypothetical line.

5. The virtual image display system according to claim 4, wherein the first hypothetical line is orthogonal to a traveling direction of the image light within the light guide plate as seen from a direction along the optical axis of the projection lens, and
the first engaging part and the second engaging part are respectively provided in positions opposed to each other with the light guide plate in between.

6. The virtual image display system according to claim 1, wherein the light guide plate includes:
an image lead-in part that is provided to face the projection lens and leads the image light from the projection lens into the light guide plate;
a total reflection part that has a pair of total reflection surfaces formed in flat shapes orthogonal to an optical axis of the projection lens in parallel to each other, and guides the image light that has been led into the light guide plate in a direction away from the image lead-in part by total reflection on the pair of total reflection surfaces; and
an image lead-out part that guides the image light that has been guided by the total reflection surface to the external predetermined position, and
the positioning structure includes a positioning surface provided in the first holding member in a flat shape orthogonal to the optical axis, and
the positioning surface performs positioning of the light guide plate with respect to the projection lens in a direction along the optical axis by being in contact with the total reflection surface.

* * * * *